US008648489B2

(12) United States Patent
Hontani et al.

(10) Patent No.: US 8,648,489 B2
(45) Date of Patent: Feb. 11, 2014

(54) POWER SUPPLY CONTROL DEVICE FOR VEHICLE

(75) Inventors: Kenji Hontani, Toyota (JP); Masahiko Shinagawa, Gifu (JP); Kenji Kataoka, Susono (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 1184 days.

(21) Appl. No.: 12/307,868

(22) PCT Filed: Oct. 4, 2007

(86) PCT No.: PCT/JP2007/069907
§ 371 (c)(1),
(2), (4) Date: Jan. 7, 2009

(87) PCT Pub. No.: WO2008/050617
PCT Pub. Date: May 2, 2008

(65) Prior Publication Data
US 2009/0289498 A1 Nov. 26, 2009

(30) Foreign Application Priority Data
Oct. 23, 2006 (JP) .................................. 2006-287762

(51) Int. Cl.
*B60L 1/00* (2006.01)
(52) U.S. Cl.
USPC .......................................... 307/9.1; 307/10.1
(58) Field of Classification Search
USPC .................................. 307/9.1, 10.1
See application file for complete search history.

(56) References Cited

U.S. PATENT DOCUMENTS

| 6,301,528 | B1 | 10/2001 | Bertram et al. | |
|---|---|---|---|---|
| 6,745,117 | B1 | 6/2004 | Thacher et al. | |
| 6,868,324 | B2 | 3/2005 | Matsumoto et al. | |
| 2004/0124703 | A1* | 7/2004 | Tani et al. | 307/10.1 |
| 2004/0155624 | A1 | 8/2004 | Amano et al. | |
| 2004/0232769 | A1* | 11/2004 | Pickering | 307/10.1 |

FOREIGN PATENT DOCUMENTS

| DE | 103 47 684 A1 | 5/2004 |
|---|---|---|
| DE | 10 2004 042 000 A1 | 3/2006 |
| EP | 1 293 388 A2 | 3/2003 |
| EP | 1 515 490 A1 | 3/2005 |
| JP | 05-077680 A | 3/1993 |
| JP | 07-063115 A | 3/1995 |
| JP | 07-253832 A | 10/1995 |
| JP | 10-221451 A | 8/1998 |
| JP | 2003-118511 A | 4/2003 |

(Continued)

OTHER PUBLICATIONS

Japanese Office Action dated Dec. 14, 2010 issued with respect to Japanese Patent Application No. 2008-287762 with English-language translation.

*Primary Examiner* — Fritz M Fleming
(74) *Attorney, Agent, or Firm* — Sughrue Mion, PLLC

(57) ABSTRACT

A power supply control device for a vehicle includes a plurality of electrical loadings installed in a vehicle; a feeding part configured to supply electric power to the electrical loadings; and a presumption part configured to presume an electrical power demand for operating the electrical loadings based on sign information for foreseeable operations of the electrical loadings. Electrical power supply from the feeding part to each electrical loading is adjusted based on the result of presumption by the presumption part.

20 Claims, 9 Drawing Sheets

(56) References Cited

FOREIGN PATENT DOCUMENTS

| | | |
|---|---|---|
| JP | 2003-256999 A | 9/2003 |
| JP | 2004-194364 | 7/2004 |
| JP | 2004-196060 A | 7/2004 |
| JP | 2005-248841 A | 9/2005 |
| WO | 02/087053 A1 | 10/2002 |

* cited by examiner

VELOCITY: V
STEERING ANGULAR
VELOCITY: ω

POWER SUPPLY CONTROL DEVICE FOR VEHICLE

TECHNICAL FIELD

The present invention generally relates to power supply control devices for vehicles. More particularly, the present invention relates to a power supply control device for a vehicle, the device being configured to control feed for electrical loading provided in the vehicle.

BACKGROUND ART

Conventionally, a vehicle electric power distribution adjusting device configured to prevent degradation of functions due to shortage of supply of electric power has been suggested (see, for example, Japanese Laid-Open Patent Application Publication No. 5-77680). This vehicle electric power distribution adjusting device detects a demanded electric power level of each electric demand equipment unit so as to calculate a sum of the demanded electric powers. When the sum of the demanded electric powers exceeds an allowable electric power of an electric power supply side, electrical power consumption of the electric demand equipment having a low priority is limited.

However, in the above-mentioned related art, the electric power distributed to each electrical loading is adjusted based on a preset order of priority after the demanded electric power of each electrical loading is detected. Accordingly, as the demanded electric power of the electric demand equipment units having a high priority is larger so that the demanded electric power exceeds the allowable electric power of the electric power supply side, electric power supply to other electric demand equipment units is more difficult.

DISCLOSURE OF THE INVENTION

Accordingly, it is a general object of the present invention to provide a novel and useful power supply control device for a vehicle.

Another and more specific object of the present invention is to provide a power supply control device for a vehicle whereby limited electric power to be supplied can be effectively used.

The above object of the present invention is achieved by a power supply control device for a vehicle, including a plurality of electrical loadings installed in a vehicle; a feeding part configured to supply electric power to the electrical loadings; and a presumption part configured to presume an electrical power demand for operating the electrical loadings based on sign information for foreseeable operations of the electrical loadings; wherein electrical power supply from the feeding part to each electrical loading is adjusted based on the result of presumption by the presumption part.

According to the power supply control device for the vehicle, electric power demand per se is presumed so that it is possible to adjust the feed to the electrical loading units in advance before the electric power demand is actually generated. Accordingly, neither too much nor too little electric power can be supplied.

The presumption part may presume timing of electric power consumption of the electrical loadings and controls so that the timing at the electrical loadings is not overlapped.

According to the above-mentioned the power supply control device for the vehicle, it is possible to stably supply the electric power.

At the electrical loading, the electrical power consumption may be generated at the time when a grace period passes after the electric power consumption is required.

According to the above-mentioned the power supply control device for the vehicle, a grace period until the start of electric power consumption is provided for each electrical loading. Therefore, it is possible for an urgent priority electrical loading, such as electrical loading required for starting immediately after an operations requirement, to be given a priority to be treated before operations of other electrical loading are started.

The length of the grace period may be changed based on the sign information.

According to the above-mentioned power supply control device for the vehicle, it is possible to set the period of the grace period proper for contents of the sign information. In addition, by setting the grace period short, interruption may not happen so that the electric power can be supplied to each electrical loading as desired.

Each of the electrical loading may compare a grace period of other electrical loading received via a communication line and generate electric power consumption when own grace period is shortest.

According to the above-mentioned power supply control device for the vehicle, it is possible to securely prevent overlapping of electric power consumption between the electrical loadings.

The grace period sent via the communication line may be shorter than a grace period of the electrical loading of a sender.

According to the above-mentioned power supply control device for the vehicle, delay time due to use of communication can be considered so that the likelihood of preventing overlapping of the electric power consumption is increased.

The presumption part may presume a consumption electrical current of the electrical loading; and control may be performed so that the sum of the consumption electrical currents presumed by the presumption part does not exceed a feeding limitation value of the feeding part.

According to the above-mentioned power supply control device for the vehicle, it is possible to stably supply the electric power.

The electrical current supplied from the feeding part to the electrical loading may be limited. The feeding limitation value may be heightened by increasing a feeding capability of the feeding part. A control device may be provided for every electrical loading; and each control device may include the presumption part.

According to the above-mentioned power supply control device for the vehicle, the presumption part is provided for every control device configured to control the electrical loading. Each of the presumption parts provided for every control device performs presumption of only the electrical loading being controlled by the control device. Therefore, it is possible to improve precision of presumptions.

A first electrical loading configured to consume electrical power based on a steering state of the vehicle may be contained in the electrical loading; and the presumption by the presumption part may be performed based on a sight line or a face direction of a driver, sign of operation of the first electrical loading. A first electrical loading configured to consume an electrical power based on a steering state of the vehicle may be contained in the electrical loading; and the presumption by the presumption part may be performed based on a configuration of a load, sign of operation of the first electrical loading. The first electrical loading may be a motor for providing for an electrically driven power steering.

A second electrical loading configured to consume electrical power based on horizontal acceleration of the vehicle may be contained in the electrical loading; and the presumption by the presumption part may be performed based on a configuration of a load, sign of operation of the second electrical loading. The second electrical loading may be a motor for providing for an electrically driven stability control device.

A third electrical loading configured to consume an electrical power based on a braking state of the vehicle may be contained in the electrical loading; and the presumption by the presumption part may be performed based on a loading given to a braking control part to the driver, sign of operation of the third electrical loading. The third electrical loading may be a motor for providing for an electrically driven brake device.

A fourth electrical loading configured to consume an electrical power based on the rotational speed of engine of the vehicle may be contained in the electrical loading; and the presumption by the presumption part may be performed based on the rotational speed of the engine, sign of operation of the fourth electrical loading. The fourth electrical loading may be a secondary air supply device.

According to embodiments of the present invention, it is possible to provide a power supply control device for a vehicle whereby limited electric power to be supplied can be effectively used.

Other objects, features, and advantages of the present invention will become more apparent from the following detailed description when read in conjunction with the accompanying drawings.

BEST MODE FOR CARRYING OUT THE INVENTION

A description will now be given, with reference to FIG. 1 through FIG. 14, of embodiments of the present invention.

First Embodiment of the Present Invention

Figure 1:
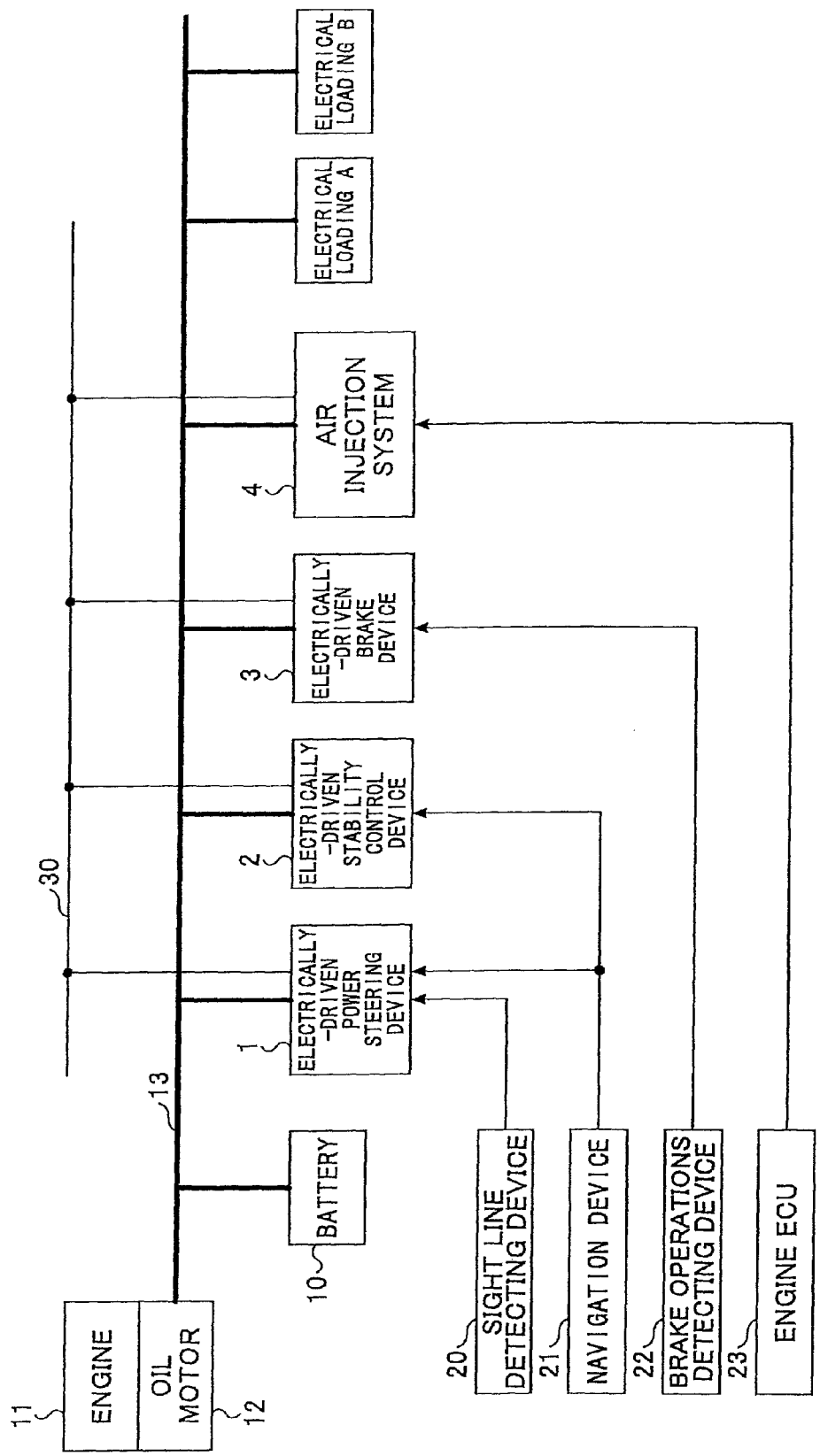
FIG. 1 is a block diagram of a power supply control device for a vehicle of a first embodiment of the present invention.

FIG. 1 is a block diagram of a power supply control device for a vehicle of a first embodiment of the present invention.

Plural electrical loading units, such as an electrically-driven power steering device 1, an electrically-driven stability control device 2, an electrically-driven brake device 3, an air injection system 4, are installed in a vehicle of the first embodiment of the present invention.

The electrically-driven power steering device 1 is configured to generate steering force by a motor based on a steering state so as to support steering operations of a driver. The electrically-driven power steering device 1 includes a motor for adjusting the electric power feed force and a computer for adjusting the feed force (electrically-driven power steering ECU). The motor for adjusting the feed force is, for example, a motor for adjusting the stroke of a rack of a steering mechanism. For example, in a case where the electrically-driven power steering ECU determines that starting the motor for adjusting the steering force is necessary based on a sensor signal from a torque sensor or a steering angle sensor, the electrically-driven power steering ECU makes a start requirement generating flag for of the motor for adjusting the steering force so as to output a driving signal for driving the motor for adjusting the steering force. The motor for adjusting the steering force is operated based on the driving signal. By operations of the motor for adjusting the steering force, the steering operations of the driver can be assisted.

The electrically-driven stability control device 2 controls a stabilizer configured to prevent roll of the vehicle by electrically driving in order to improve the capability to go or the capability for get-on/get-off motions. The electrically-driven stability control device 2 controls a position of the vehicle so that a roll angle proper for corresponding to acceleration in a horizontal direction of the vehicle is produced.

The electrically-driven stability control device 2 includes a motor for adjusting a roll angle and a computer for adjusting the roll angle (electrically-driven stability ECU). The motor for adjusting the roll angle is, for example, a rotary actuator configured to twist a torsion bar.

For example, in a case where the electrically-driven stability ECU determines that starting the motor for adjusting the roll angle is necessary based on a sensor signal from a horizontal acceleration sensor, the electrically-driven power stability ECU makes a start requirement generating flag of the motor for adjusting the roll angle so as to output a driving signal for driving the motor for adjusting the roll angle. The motor for adjusting the roll angle is operated based on the driving signal. By operations of the motor for adjusting the roll angle, the roll angle of the vehicle can be adjusted.

There is an active height control suspension (AHC) device as a system configured to improve the capability to go or the capability for get-on/get-off motions, as well as the electrically-driven stability control device 2. The active height control suspension device controls the height of the vehicle based on a state of the vehicle or an order from the user. For example, the active height control suspension device controls for keeping the vehicle at a certain height or for making a proper height based on the speed of the vehicle. The active height control suspension device includes a motor for active height control (AHC motor) and a computer for active height control (AHC-ECU). The AHC motor is a motor for driving a pump in order to adjust oil pressure for controlling the height of the vehicle. When the AHC-ECU receives, for example, a vehicle height adjusting request signal such as an order signal from another computer or operations signal from a vehicle height adjusting operations device such as a vehicle height switch which can be operated by a user, the AHC-ECU sets a starting requirement generation flag of the AHC motor and outputs a driving signal for driving the AHC motor. In addition, when the AHC-ECU determines that starting the AHC motor is necessary based on the sensor signal from the vehicle speed sensor, the vehicle height sensor, or the like, the AHC-ECU sets the starting requirement generation flag of the AHC motor and outputs the driving signal for driving the AHC motor. Based on the driving signal, the AHC motor is driven. By operations of the AHC motor, the vehicle height can be adjusted.

The electrically-driven brake device 3 automatically adjusts a braking force of right and left of the vehicle in order to improve stability of behavior of the vehicle, based on the state of the vehicle such as acceleration in a horizontal direction, a yaw rate, or a rudder angle. The electrically-driven brake device 3 includes a braking force adjusting motor (Vehicle Stability Control motor) and a braking force adjusting computer (VSC-ECU). The VSC motor is for driving a pump, the pump being configured to adjust the oil pressure for adjusting the braking force. When the VSC-ECU determines that staring the VSC motor is necessary based on the sensor signal from the vehicle speed sensor, the acceleration sensor, the yaw rate sensor, the rudder sensor, or the like, the VSC-ECU sets the starting requirement generation flag of the VSC motor and outputs the driving signal for driving the VSC motor. Based on the driving signal, the VSC motor is driven. By operations of the VSC motor, the braking force is adjusted so that behavior of the vehicle can be stabilized. In addition, as the electrically-driven brake device 3, a hydro-booster is used so as to assist the brake operations force of the driver by not a negative pressure due to intake of the engine but an electro-hydraulic pump.

The air injection system 4 is a secondary air supplying device configured to promote complete combustion of the exhaust gas by sending air from the air cleaner to the exhaust port. When a computer of the air injection system 4 determines that starting the air injection system 4 is necessary based on information of rotational speed of the engine or the sensor signal from the exhaust sensor, the computer sets the starting requirement generation flag so that the air injection system 4 is started.

The computers (ECU) provided at the electrically-driven power steering device 1, the electrically-driven stability control device 2, the electrically-driven brake device 3, the air injection system 4, and the vehicle height adjusting device include plural circuit elements such as a ROM configured to store a control program or control data, a RAM configured to store processing data of the control program for a while, a CPU configured to process the control program, and an input and output interface configured to exchange information with the outside.

Each ECU of the electrically-driven power steering device 1, the electrically-driven stability control device 2, the electrically-driven brake device 3, the air injection system 4, and the vehicle height adjusting device is connected to the others via a communication line so as to communicate with each other. The communication line 30 is, for example, a CAN (controller area network) bus.

Other than electrical loading such as the above-mentioned electrically-driven power steering device 1, the electrical loadings A and B are provided in the vehicle of the first embodiment of the present invention. For example, an engine control device, a brake control device, an air conditioner, a head light, a rear defogger, a rear wiper, a mirror heater, an audio device, a cigar socket, various ECUs, and a solenoid valve can be used as the electrical loadings A and B.

A battery 10 or an alternator 12 can be used as an electric power source of the electrical loading units such as the electrically-driven power steering device 1. The battery 10 or the alternator 12 supplies the electric power to each electrical loading via an electric power source line (harness) 13. A battery device such as a lead (Pb) battery, a lithium ion battery, a nickel hydrogen battery, and an electrical double layer capacitor can be used as the battery 10.

The alternator 12 may be connected to the battery 10 via the electric power source line 13 so as to generate electricity by converting kinetic energy to electrical energy. The alternator 12 generates electricity by output of the engine 11 for moving the vehicle. The electric power generated by the alternator 12 is supplied to the electrical loading units such as the electrically-driven power steering device 1 and is changed in the battery 10. In a state where the alternator 12 is stopped, the electric power can be supplied from the battery 10 to each of the electrical loadings. For example, the electric power necessary for parking state where the engine 11 is stopped and the alternator 12 is not operated can be supplied from the battery 10.

In the meantime, as the amount of the consumption electricity or the number of electrical loadings receiving the electric power supply from the battery 10 or the alternator 12 via the electric power source line 13 is increased, the voltage of the battery 10 may be reduced to a degradation state. For example, when the starting requirement of the motor configured to adjust the steering force of the electrically-driven power steering device 1 and the motor configured to adjust the roll angle of the electrically-driven stability control device 2 are generated at the substantially same time, operations electrical currents of the motor configured to adjust the steering force of the electrically-driven power steering device 1 and the motor configured to adjust the roll angle of the electrically-driven stability control device 2 (rush current that is greater for a while than operations electrical current at a steady state) are larger than the electrical loading such as the audio device. Accordingly, the motor configured to adjust the steering force of the electrically-driven power steering device 1 and the motor configured to adjust the roll angle of the electrically-driven stability control device 2 are operated so that the large electric power is consumed so as to exceed the feeding capability of the battery 10 or the alternator 12 for a while.

As a result of this, a decrease of the voltage of the battery 10 is generated and malfunctions of the electrical loading units connected to the battery 1 including the electrically-driven power steering device 1 and the electrically-driven stability control device 2 that are reasons for degradation of the voltage (especially, the electrical loading whose minimum operations voltage of the navigation device or the like is relatively higher than other electrical loading) may be caused. For example, reset or error operations of the computer or output degradation of the motor may happen. In addition, blinking may happen if the electrical loading unit connected to the battery 10 is a lamp. Therefore, it is necessary to take a measure for preventing drop of the electric power source voltage by using the electrical power source at the substantially same time.

Figure 2:
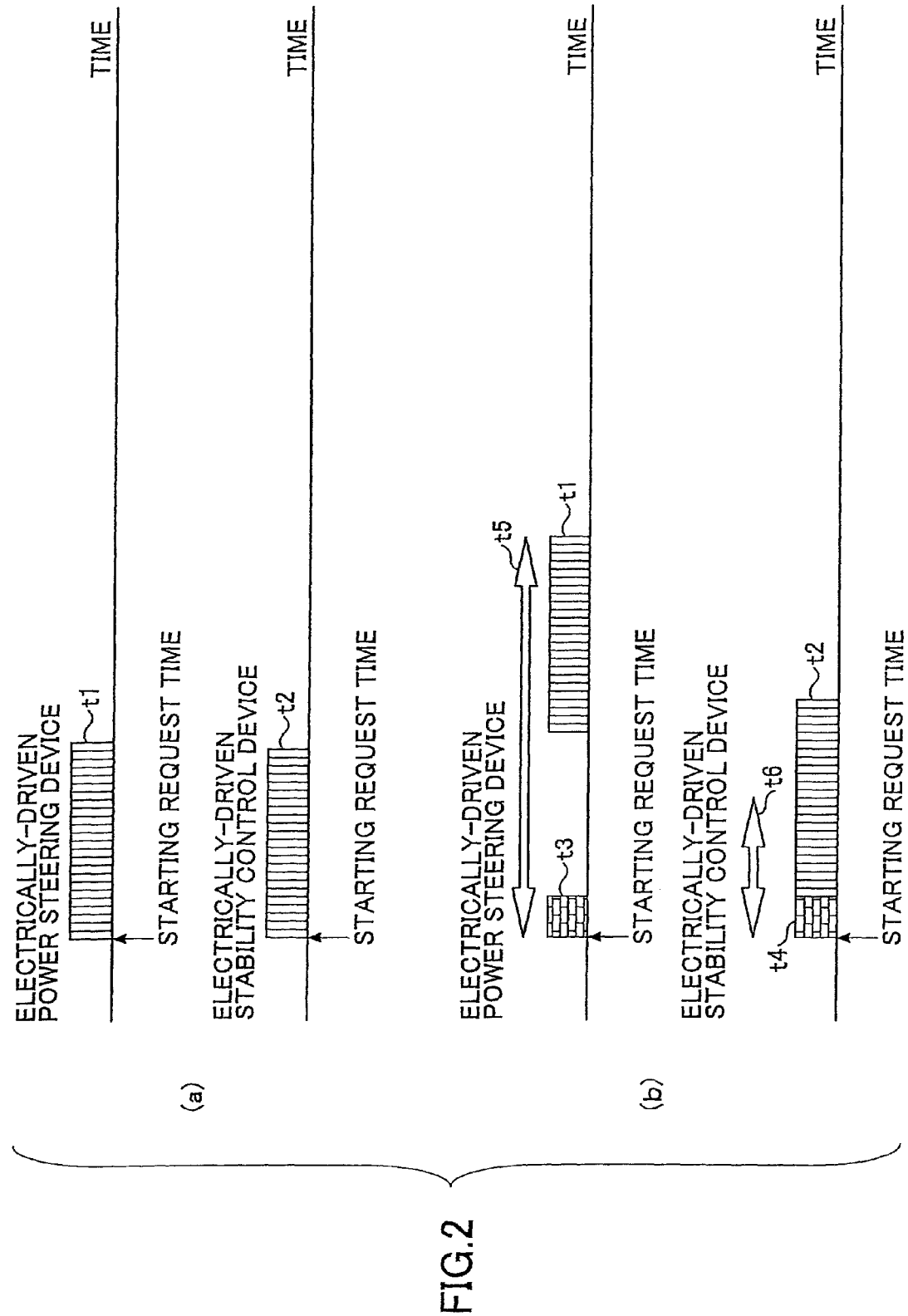
FIG. 2 is a view showing relationships of operation timing between a motor configured to adjust a steering force of an electrically-driven power steering device 1 and a motor configured to adjust a roll angle of an electrically-driven stability control device 2.

FIG. 2 is a view showing the relationship of operation timing between a motor configured to adjust a steering force of the electrically-driven power steering device 1 and a motor configured to adjust a roll angle of the electrically-driven stability control device 2.

A time period t1 of FIG. 2 indicates a time period during which voltage drop equal to or greater than a designated value by operations electric current after the motor configured to adjust the steering force is started is generated at the battery 10. A time period t2 of FIG. 2 indicates a time period during which voltage drop equal to or greater than a designated value by operations electric current after the motor configured to adjust the roll angle is started is generated at the battery 10.

As shown in FIG. 2(*a*), starting requirements of the motor configured to adjust the steering force of the electrically-driven power steering device 1 and the motor configured to adjust the roll angle of the electrically-driven stability control device 2 are generated at the substantially same time. Based on the starting requirements, operations of the motor configured to adjust the steering force of the electrically-driven power steering device 1 and the motor configured to adjust the roll angle of the electrically-driven stability control device 2 are independently started so that the time period t1 and the time period t2 may be overlapped at the same time period. As a result of this, the voltage exceeds the feeding capability of the battery 10 and the alternator 12 for a while so that the voltage drop of the battery 10 is drastically increased and an obstacle to the operation of the electrical loading units that may be receiving feeding from the battery 10 may happen.

Because of this, the vehicle electric power source control device of the first embodiment of the present invention, based on a delay capable time period, controls so that each electrical loading such as the steering force of the electrically-driven power steering device 1 is not operated at the same time. Here, the delay capable time period is set for every electrical loading and can be granted postponement from the starting requirement of the electrical loading to actual starting. If each electrical loading is started within the delay capable time period, the function of each electrical loading can be normally achieved. Each electrical loading is not immediately started at the time when the starting request is made. Each electrical loading sends the delay capable time period where starting can be delayed by itself to other electrical loading units so that electrical loading units having a shorter remaining time among all electrical loading units are started in order. At this time, it is preferable that the delay capable time period is sent by eliminating a maximum communication delay time for it to reach the recipient electrical loading units via the communication line 30 in advance. If the delay capable time period is sent without eliminating the maximum communication delay time, the delay capable time period may reach a limitation value when the signal reaches the recipients. In a case of the electrical loading having a delay capable time period shorter than the communication delay time, the delay capable time period is not sent to other electrical loading units and starting based on generation of starting requirement is immediately performed.

The time period t5 of FIG. 2(*b*) indicates the delay capable time period being set for the motor configured to adjust the steering force of the electrically-driven power steering device 1. The time period t6 of FIG. 2(*b*) indicates the delay capable time period being set for the motor configured to adjust the roll angle of the electrically-driven stability control device 2.

In order to prevent each electrical loading from being simultaneously operated based on the delay capable time period, the electrical loading having a shorter operations time from operation starting and a shorter delay capable time period is started in order. The time period t6 of the motor configured to adjust the roll angle of the electrically-driven stability control device 2 is shorter than the time period t5 of the motor configured to adjust the steering force of the electrically-driven power steering device 1. In addition, the time period t3 and t4 are adjusting time periods for determining which electrical loading is started by the communication. Accordingly, even if the starting requirement of the motor configured to adjust the steering force of the electrically-driven power steering device 1 and the starting requirement of the motor configured to adjust the roll angle of the electrically-driven stability control device 2 are simultaneously generated, the motor configured to adjust the steering force of the electrically-driven power steering device 1 is started after the motor having the short delay capable time period and configured to adjust the roll angle of the electrically-driven stability control device 2 is started, so that the rush currents are not overlapped and the drop of the electric power voltage can be prevented.

Figure 3:
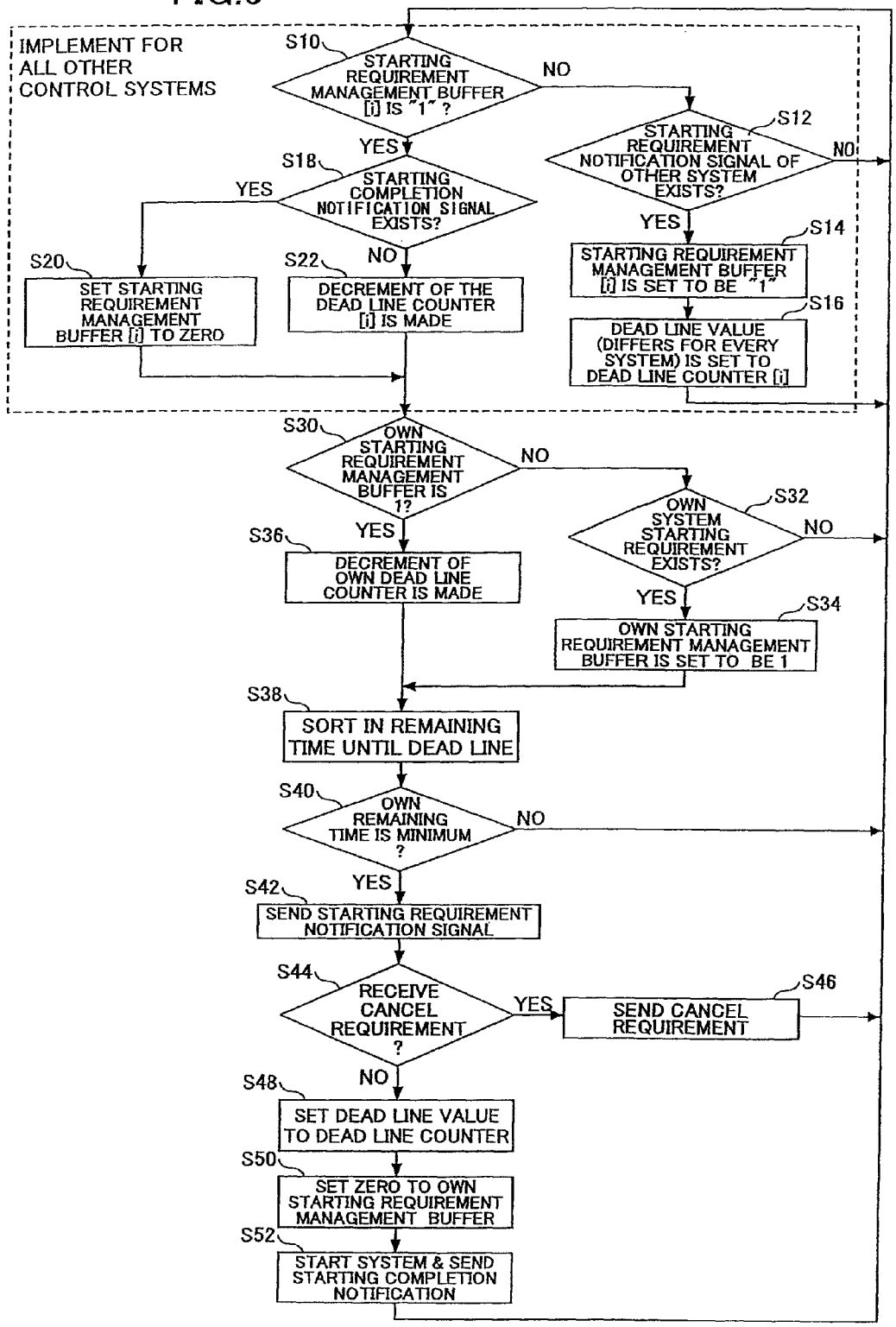
FIG. 3 is a flowchart of operations of a system connected to an electric power source 13 at the power supply control device for the vehicle of the first embodiment of the present invention.

FIG. 3 is a flowchart of operations of a system connected to the electric power source 13 at the power supply control device for the vehicle of the first embodiment of the present invention. All or a part of systems connected to the electric power source line 13 is operated by following the operations flow shown in FIG. 3. Each system is connected to the others via the communication line 30 so as to exchange information. Each system has a buffer for managing an implementing state of own system and a buffer for managing an implementing state of other systems.

One of the electrical loadings connected to the electric power source 13 is presumed as a system X. A system X (own system) confirms whether a starting requirement management buffer [i] with respect to a system Y (other system) connected to the electric power source 13 is "1" in step S10. Here, the starting requirement management buffer [i] is a buffer for managing the existence of receipt of a starting requirement notification signal of each system, that is, a starting requirement generation flag. If a value of the starting requirement management buffer [i] of a certain system is "1", this means that system is already in receipt of the starting requirement notification signal of the system. The starting requirement notification signal is a signal for notifying starting of the system to other systems and is sent from each system. Information regarding the delay capable time period where the maximum communication delay time is eliminated is contained in the starting requirement notification signal being sent by each system.

If the starting requirement management buffer [i] with respect to the system Y is not "1" (NO in step S10), the existence of receipt of the starting requirement notification signal of the system Y is monitored in step S12. If there is the starting requirement notification signal of the system Y (YES in step S12), the starting requirement management buffer [i] with respect to the system Y is set to be "1" in step S14 and a dead line value is set to a dead line counter [i] with respect to the system Y in step S16. The dead line counter [i] is a counter for managing timing when operations of each system are started. The dead line value indicates the timing when the operations of each system are started. When the dead line value of the dead line counter [i] becomes zero, the system regards that operations of the system related to the dead line counter [i] are started. The dead line value is set by the delay capable time period included in the start requirement notification signal and differs for every system.

On the other hand, in a case where the starting requirement managing buffer [i] with respect to the system Y is "1" (YES in step S10), the system X determines the existence of receipt of a starting completion notification signal with respect to the system Y in step S18. The starting completion notification signal is a signal sent from the system to other system for notifying the completion of starting of the own system. In a case where the system X receives the starting completion notification signal with respect to the system Y (YES in step S18), the system X sets a starting requirement management buffer [i] with respect to the system Y to be zero in step S20. On the other hand, if the system X does not receive the starting completion notification signal with respect to the system Y (NO in step S18), decrementing of the dead line counter [i] is made by a designated number in step S22. The system X implements steps surrounded by a dotted line in FIG. 3 for not only the system Y but also other systems.

After processes of the steps surrounded by the dotted line in FIG. 3 are completed for all systems, the system X confirms whether "own starting requirement management buffer" that is its own starting requirement management buffer is "1" in step S30. In a case where the own starting requirement management buffer is not "1" (No in step S30), the system X determines whether there is a starting requirement to the own system X in step S32. In a case where the starting requirement is made to the system X itself (YES in step S32), the own starting requirement management is set to be "1" in step S34. On the other hand, in a case where the own starting requirement management buffer is "1" (YES in step S30), the system X is made to decrement the own dead line counter by the designated number in step S36.

The system X implements sorting based on the remaining time until the dead line of each system, namely a dead line value of the dead line counter with respect to each system, in step S38. The system X determines whether the own dead line value is minimum among all systems, that is whether own remaining time is minimum, in step S40.

If the own remaining time is minimum (YES in step 40), the system X sends the starting requirement notification signal to other system in step S42. After the starting requirement notification signal is sent in step S42, the system X cancels the own starting in step S46 if a cancel requirement signal for requiring cancellation of own starting is received until a designated time considering the communication delay passes (YES in step S44).

On the other hand, after the starting requirement notification signal is sent in step S42, a designated dead line value is set to the own dead line counter for managing the own operations starting point if a cancel requirement signal for requiring cancellation of own starting is not received until a designated time considering the communication delay passes (NO in step S44). The system X sets zero in the own starting requirement management buffer in step S50, and begins starting the system and sends the starting completion notification signal in step S52. Each system other than the system X implements the flow shown in FIG. 3. Accordingly, each system implements the operations flow shown in FIG. 3 so that it is possible to prevent the systems from simultaneously starting.

In the meantime, that the delay capable time period of the system is long means waiting can be done for a while, in other words, the system has a low priority. Accordingly, by using this point, for example, the delay capable time period can be changed based on a working state of the system or the requirement from the user so that each system can be efficiently controlled.

For example, in a case where a certain system may not be operated so that possibility of demand of the electric power of a certain system may be low, the delay capable time period of the system is changed longer in advance so that the responsiveness of the systems other than this can be relatively improved. On the other hand, in a case where a certain system may be operated so that the possibility of demand of the electric power of a certain system may be high, the delay capable time period of the system is changed shorter in advance so that the responsiveness of the system can be improved.

Because of this, in the vehicle electric power source control device of the first embodiment of the present invention where each system manages the delay capable time period (dead line value) of the others, based on the sign information estimating the demand of the own electric power of each system, generation of the demand of the electric power is presumed so that the own delay capable time based on the result of the presumption is set. For assuming the generation of the demand of the electric power by each system, as shown in FIG. 1, the vehicle electric power source control device of the first embodiment of the present invention includes a sight line detecting device 20, a navigation device 21, a brake operations detecting device 22, and an engine ECU 23.

The sight line detecting device 20 detects the sight line or a direction of the face of a person on the vehicle based on a photographed image taken by a camera in the vehicle. When the driver navigates the vehicle, the sight line or the direction of the face is changed in a direction the vehicle is navigated. Because of this, if it is regarded as a sign of navigation of the vehicle that the sight line or the direction of the face of the driver is changed from a front surface direction to a non-front direction (oblique direction), it can be presumed by the slight line detecting device 20 in advance that the vehicle is being navigated due to detection of the change, namely generation of the demand of electric power of the motor configured to adjust the steering force of the electrically-driven power steering device 1. Therefore, when the change is detected by the sight line detecting device 20, the delay capable time period of the motor configured to adjust the steering force of the electrically-driven power steering device 1 is shortened so that the responsiveness of the motor configured to adjust the steering force can be improved without overlapping the operations of other system.

The navigation device 21 includes a GPS device and a map DB database. The GPS device specifies the position of the own vehicle by two-dimensional or three-dimensional coordinate data based on information received from a GPS satellite to a GPS receiver. On the other hand, the map DB stores map information with high precision. The map information with high precision includes information with respect to a load configuration or a land form such as a straight line, a curve, a junction road, a road surface inclination, and cant or information with respect to positions of facilities such as intersections, railway-crossings, a parking lot, or a tollgate (ETC lane) together with coordinate data of the positions. The map information in the map DB may be renewed via communications between vehicles, communications between the load and the vehicle, communications with the outside such as a designated management center, a medium such as a CD or DVD, or the like. Accordingly, the navigation device 21 can recognize, based on the vehicle position detected by the GPS device and the map information in the map DB, the position on the map where the own vehicle is situated.

Accordingly, when the vehicle drives along the curve, it is expected that the motor configured to adjust the steering force of the electrically-driven power steering device 1, the starting requirement of the motor configured to adjust the roll angle of the electrically-driven stability control device 2, and the AHC motor of the vehicle height control device are operated. Therefore, if a vehicle's driving just in front of the curve is regarded as a sign of generation of demand of the electric power of these motors, generation of demand of the electric power of these motors can be presumed in advance by detecting the vehicle's driving just in front of the curve by the navigation device 21. Accordingly, in a case where vehicle's driving just in front of the curve is detected by the navigation device 21, the delay capable time period of the motor configured to adjust the steering force of the electrically-driven power steering device 1, the starting requirement of the motor configured to adjust the roll angle of the electrically-driven stability control device 2, and the AHC motor of the vehicle height control device is shortened so that the responsiveness of these motors can be improved without overlapping with the operations of other systems.

The brake operations detecting device 22 is configured to detect the brake operations of the driver. The brake operations detecting device 22 is, for example, a touch sensor or a brake sensor whereby contact between a foot of the driver and a brake pedal can be detected or a velocity sensor whereby an initial velocity of stepping operations of the brake pedal by the driver.

When the driver steps on the brake pedal, it is expected that the VSC motor of the electrically-driven brake device 3 or the hydro booster will be operated. Therefore, if starting stepping on the brake pedal is regarded as a sign of generation of demand of the electric power of the VSC motor or the hydro booster, generation of the demand of the electric power of the VSC motor or the hydro booster can be presumed in advance by detecting starting stepping on the brake pedal by the brake operations detecting device 22. Accordingly, in a case where starting on stepping of the brake pedal is detected by the brake operations detecting device 22, the delay capable time period of the VSC motor or the hydro booster is shortened so that the responsiveness of the VSC motor or the hydro booster can be improved without overlapping with the operations of other systems.

The engine ECU 23 is a control computer configured to control the engine 11 and includes information with respect to the engine 11. Accordingly, it is possible to obtain information of the rotational speed of the engine from the engine ECU 23. Therefore, if the rotational speed of the engine is equal to or greater than the designated value, the operations of the AI 4 are not expected. Hence, if change of the rotational speed of the engine to be equal to or less than the designated value is regarded as a sign of generation of demand for the electric power of the AI 4, stopping of demand of the electric power of the AI 4 can be presumed in advance by detecting the change of rotational speed of the engine to be equal to or less than the designated value by the engine ECU 23.

Accordingly, in a case where the change of rotational speed of the engine to be equal to or less than the designated value is detected by the engine ECU 23, the delay capable time period of the AI 4 is delayed so that the responsiveness of the system connected to the electric power source line 13 other than the AI 4 can be improved without overlapping with the operations of other systems.

Figure 4:
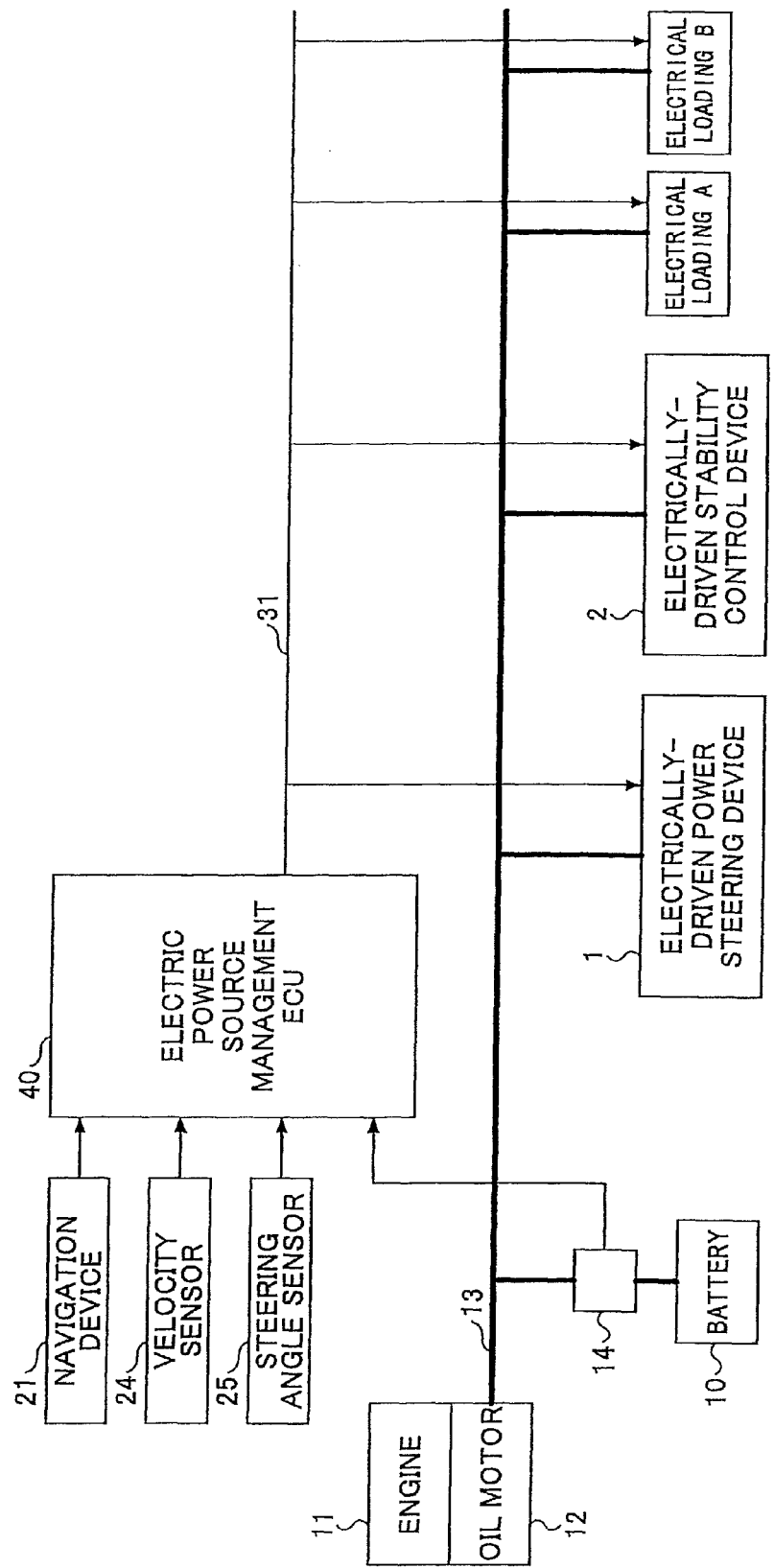
FIG. 4 is a block diagram of a power supply control device for a vehicle of a second embodiment of the present invention.

FIG. 4 is a block diagram of a power supply control device for a vehicle of a second embodiment of the present invention. In the second embodiment of the present invention, parts that are the same as the parts discussed in the first embodiment of the present invention are given the same reference numerals, and explanation thereof is omitted.

The vehicle of the second embodiment of the present invention includes plural electrical loading units such as the electrically-driven power steering device 1 or the electrically-driven stability control device 2 and an electric power source ECU 40 configured to manage electric power supply of each electrical loading unit.

The velocity sensor 24 detects the wheel speed. Corresponding to the detected value and based on a signal being output from the velocity sensor 24, the moving speed of the vehicle is calculated by the electric power source management ECU 40.

The steering angle sensor 25 is provided at a main shaft part connected to a steering wheel part or a sheering wheel. The steering angle sensor 25 detects the size of the steering angle and a steering direction when the driver steers the steering wheel. Corresponding to the detected value and based on a signal being output from the steering angle sensor 25, the steering angle is calculated by the electric power source management ECU 40. At this time, the steering direction is indicated by a positive and negative sign. For example, "+" is provided in a case of right steering and "−" is provided in a case of left steering. The electric power source management ECU 40 can calculate a derivative value of the steering angle based on the calculated steering angle, namely a steering angle velocity.

The electric power source management ECU 40 monitors the voltage of the battery 10 by the voltage sensor 14 so as to monitor whether the voltage equal to or less than the designated value is detected. When it is detected that the voltage of the battery 10 is equal to or less than the designated value, it is regarded that the electric power supply capabilities of the battery 10 or the alternator 12 are degraded. It may be regarded that the electric power supply capabilities of the battery 10 or the alternator 12 are degraded when it is detected that the battery remaining amount of the battery 10 is equal to or less than the designated value.

Figure 5:
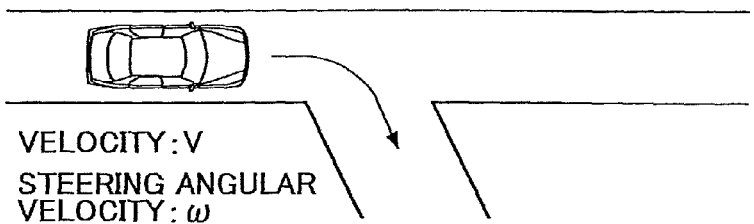
FIG. 5 is a view showing a state where a driving vehicle attempts to turn the road (turn a corner)

FIG. 5 is a view showing a state where a driving vehicle attempts to turn the load. When the moving vehicle at velocity V turns the road (make a turn), the motor configured to adjust the steering force of the electrically-driven power steering device 1 is operated in order to assist the steering operations of the driver and the motor configured to adjust the roll angle of the electrically-driven stability control device 2 is operated in order to correspond to slowing down of the vehicle. Therefore, since the motor configured to adjust the steering force of the electrically-driven power steering device 1 and the motor configured to adjust the roll angle of the electrically-driven stability control device 2 may be operated at the substantially same time, as discussed above, it is necessary to take a measure to prevent degradation of the electric power source voltage due to the operations electrical currents.

Because of this, in the electric power source management ECU 50 of the vehicle electric power source control device of the second embodiment of the present invention, based on the curve information of the navigation device 21, the own vehicle velocity information by the velocity sensor 24, the steering angle speed information by the steering angle sensor 25, and others, the operations electrical current of the motor configured to adjust the steering force of the electrically-driven power steering device 1 and the motor configured to adjust the roll angle of the electrically-driven stability control device 2 at the time when the vehicle drives along the curve are presumed. Based on the result of the presumption of the operations electrical current, control is made so that the motor configured to adjust the steering force of the electrically-driven power steering device 1 and the motor configured to adjust the roll angle of the electrically-driven stability control device 2 are not operated at the same time.

Figure 6:
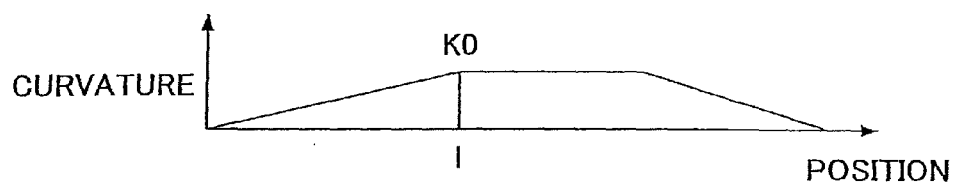
FIG. 6 is a graph showing curve information of a navigation device 21.

FIG. 6 is a graph showing curve information of a navigation device 21.

"K0" indicates a maximum curvature of the curve. "1" indicates a travel distance until the curvature becomes K0. The operations electrical current of the motor configured to adjust the steering force of the electrically-driven power steering device 1 is changed based on the steering angular velocity ω. In a case where the vehicle moved at a constant velocity V, the change of the curvature is expressed as follows.

$$K = V \times K0/1$$

In addition, the steering angle θ is expressed as follows wherein a wheel base length is expressed as L.

$$\theta = L \times K = L \times (V \times K0/1)$$

Therefore, the steering angular velocity ω is expressed as follows.

$$\omega = dLK/dt = L \times V \times K0/1 \text{ [rad/s]}$$

The electric power source management ECU 40 presumes the operations electrical current of the motor configured to adjust the steering force of the electrically-driven power steering device 1, based on the calculated steering angular velocity ω, by using a map defining the relationship between the steering angular velocity ω and the operations electrical current of the motor configured to adjust the steering force of the electrically-driven power steering device 1.

The electric power source management ECU 40 presumes the operations electrical current of the motor configured to adjust the roll angle of the electrically-driven stability control device 2 at the time when the vehicle drives along the curve, based on the curve information of the navigation device 21. The operations electrical current of the motor configured to adjust the roll angle of the electrically-driven stability control device 2 is changed based on lateral acceleration a applied to the vehicle.

The lateral acceleration α applied to the vehicle is expressed as follows.

$$\alpha = V^2 K$$

Accordingly, the electric power source management ECU 40 presumes the operations electrical current of the motor configured to adjust the roll angle of the electrically-driven stability control device 2 based on the calculated lateral acceleration α by using a map defining the relationship between the lateral acceleration α and the operations electrical current of the motor configured to adjust the roll angle of the electrically-driven stability control device 2.

The electric power source management ECU 40 makes addition of the operations electrical currents of the motor configured to adjust the steering force of the electrically-driven power steering device 1 and the motor configured to adjust the roll angle of the electrically-driven stability control device 2. If the added value may cause decrease of the voltage of the battery 10, the electric power source management ECU 40 controls so that the consumption electrical current of the electrical loading being operated and connected to the electric power source line 13 and the decrease of the voltage of the battery 10 is prevented. In addition, if the added value may cause decrease of the voltage of the battery 10, the electric power source management ECU 40 controls so that the operations electrical currents of the motor configured to adjust the steering force of the electrically-driven power steering device 1 and the motor configured to adjust the roll angle of the electrically-driven stability control device 2 are decreased and the decrease of the voltage of the battery 10 is prevented. In order to presume the voltage drop, detection of the state of an internal resistance of the battery is done in advance.

Figure 8:
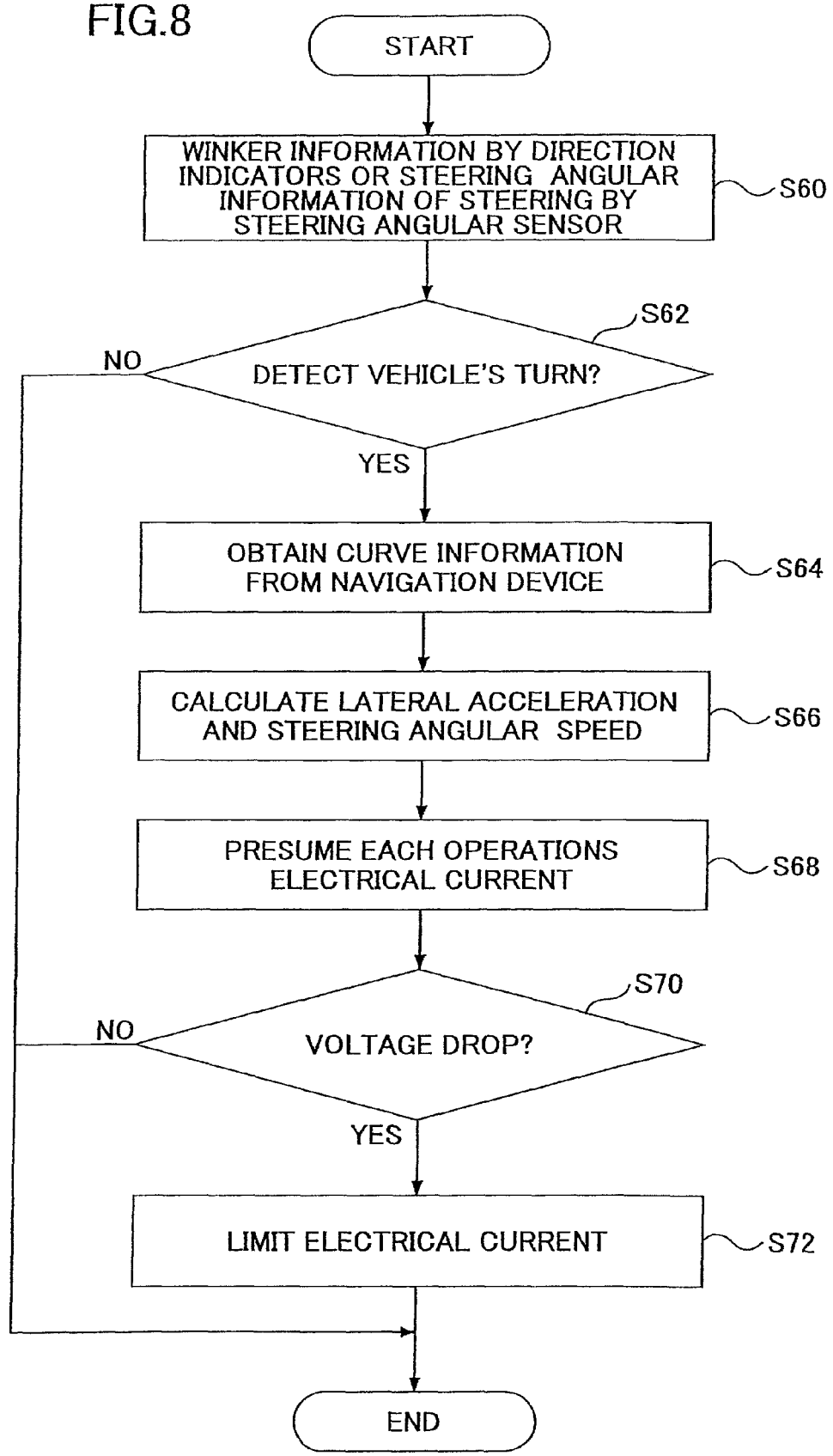
FIG. 8 is a flowchart of operations of the power supply control device for the vehicle of the second embodiment of the present invention.

FIG. 8 is a flow chart of operations of the power supply control device for the vehicle of the second embodiment of the present invention.

The electric power source management ECU 40 predicts that the vehicle turns the load in step S62 based on blinker information by direction indicators or steering angular information of the steering by steering angular sensor (step S60). If it is expected that the vehicle turns the load (YES in step S62), at which curve or junction the vehicle turns is detected by the navigation device 21 so that the curve information or the junction information can be obtained in step S64. The electric power source management ECU 40 calculates the lateral acceleration and the steering angular speed based on the curve information and others in step S66.

The operations electrical current of the motor configured to adjust the steering force of the electrically-driven power steering device 1 is presumed based on the calculated steering angular speed, and the operations electrical current of the motor configured to adjust the roll angle of the electrically-driven stability control device 2 is presumed based on the calculated lateral acceleration in step S68. When the sum of the operations electrical currents exceeds the threshold value for determining the voltage drop so that it is presumed that the electric power source voltage is dropped (YES in step S70), the value of the electrical current flowing in the electric power source line 13 is limited to the designated value in step S72.

In addition, based on the vehicle speed information, the steering conditions, and the load information such as the curve information, it is possible to predict the vehicle conditions and a moving position where peak electrical current (maximum value) of the operations electrical current of the motors of the electrically-driven power steering device 1 and the electrically-driven stability control device 2 occur.

Figure 7:
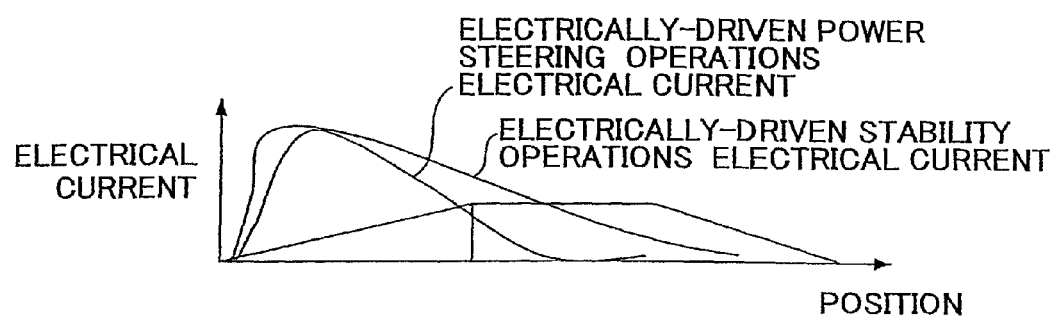
FIG. 7 is a graph showing transition of operations electrical current of the motors of the electrically-driven power steering device 1 and the electrically-driven stability control device 2 generated when the vehicle drives along the curve.

FIG. 7 is a graph showing transition of operations electrical current of the motors of the electrically-driven power steering device 1 and the electrically-driven stability control device 2 generated when the vehicle drives along the curve. When it is expected that positions where the peak electrical currents of the operations electrical currents occur will be overlapped, the operations starting timing of the motors are shifted so that the peak electrical currents are not overlapped.

Third Embodiment of the Present Invention

Figure 9:
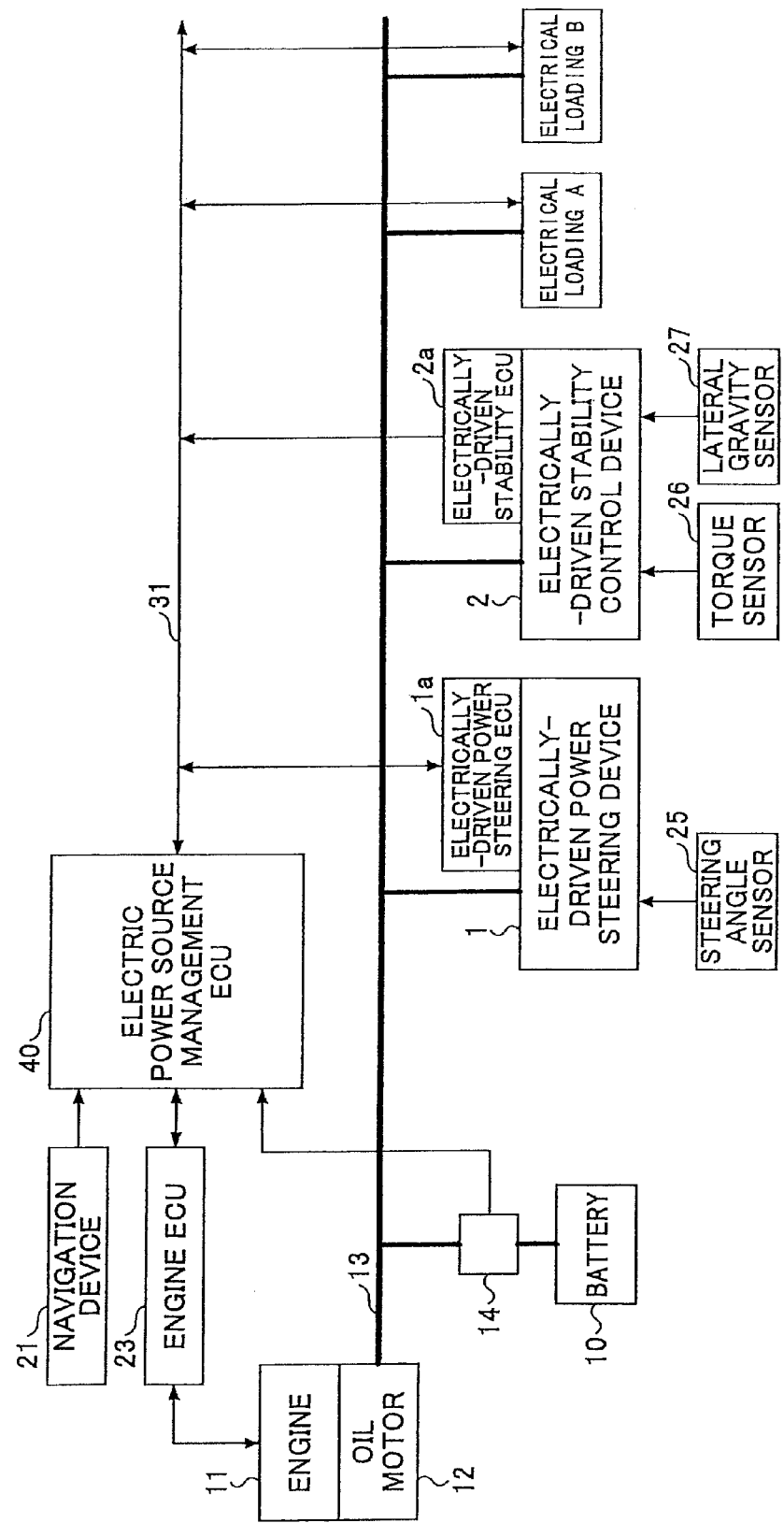
FIG. 9 is a block diagram of a power supply control device for a vehicle of a third embodiment of the present invention.

FIG. 9 is a block diagram of a power supply control device for a vehicle of a third embodiment of the present invention. In the third embodiment of the present invention, parts that are the same as the parts discussed in the first embodiment and the second embodiment are given the same reference numerals, and explanation thereof is omitted.

In the second embodiment of the present invention, the electric power source management ECU 40 makes presumption calculations. In the third embodiment of the present invention, a calculating device (electrically-driven power steering ECU 1a) provided at the electrically-driven power steering device 1 presumes the operations electrical current of the motor configured to adjust the steering force (operations electrical current of the entire electrically-driven power steering device 1), and a calculating device (electrically-driven power stability ECU 2a) provided at the electrically-driven power stability device 2 presumes the operations electrical current of the motor configured to adjust the roll angle (operations electrical current of the entire electrically-driven power stability device 2).

Each ECU calculates the presumption value of the operations electrical current of the motor controlled by the own ECU so that the communication delay can be prevented and the presumption precision can be improved, compared to a case where the electric power source management ECU 40 collects information from each ECU and calculated the presumption value of the operations electrical current of each motor. In addition, the more the subject load of the motor to be presumed increases, the more the calculation workload is increased. Therefore, preventing an increase of the subject workload of the presumption calculation in a case where dispersion is made at each ECU and the presumption calculation is made is higher than in a case where a single ECU makes all presumption calculations.

Figure 10:
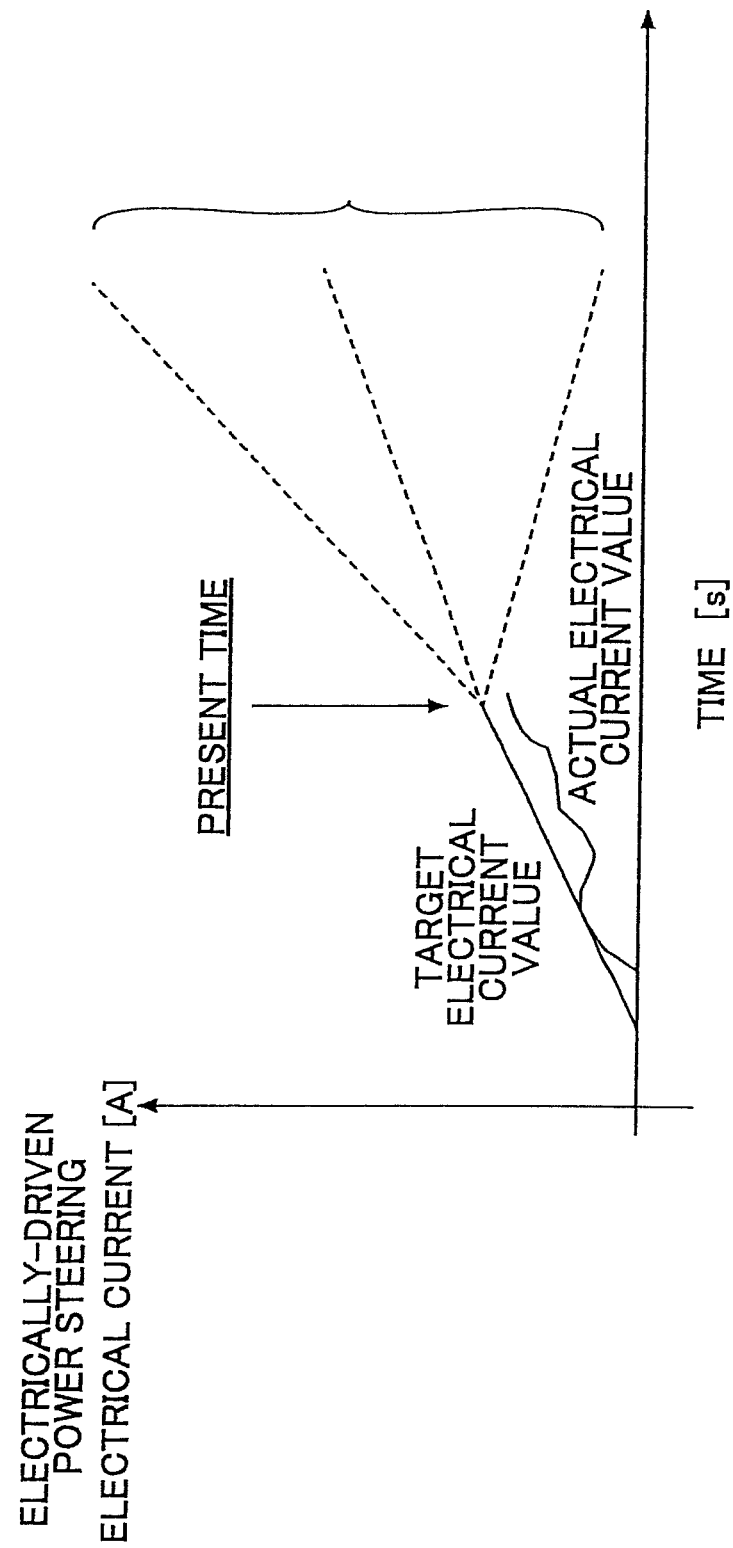
FIG. 10 is a graph showing temporal transition of operations electrical current of the motors of the electrically-driven power steering device 1.

FIG. 10 is a graph showing temporal transition of operations electrical current of the motors of the electrically-driven power steering device 1.

As shown in FIG. 10, the electrically-driven power steering ECU 1a makes presumption calculation of a maximum operations electrical current value of the motor configured to adjust the steering force expected after the designated time (for example, 400 ms), based on the current control order value to the motor configured to adjust the steering force, the vehicle speed information, the steering angular information by the steering angle sensor 25, the steering torque information by the steering torque sensor, and others. The designated time may be longer than the response time of the alternator 12. This is because even if increase or decrease of the amount of generation of electric power is ordered to be produced by the alternator 12, adjustment of the increase and decrease can be completed within a designated time. The electrically-driven power steering ECU 1a sends the presumption calculation value of the operations electrical current to the electric power source management ECU 40 via the communication line 31. The electrically-driven stability ECU 2a makes presumption calculation of a maximum operations electrical current value of the motor configured to adjust the roll angle after the designated time and sends the presumption calculation value to the electric power source management ECU 40 via the communication line 31.

The electric power source management ECU 40 calculates the sum of the presumption calculating value obtained from the ECU configured to control the electrical loading consuming a large electrical current such as the electrically-driven power steering ECU 1a. At this time, if the sum is simply calculated, the value becomes too much greater. Because of this, based on the map defining the relationship of each electrical loading, the sum of the presumption calculating value is calculated. The map defining the relationship of each electrical loading defines, for example, weight of each electrical loading at the time when the sum is calculated for every operations conditions of the vehicle when the presumption is calculated.

Figure 11:
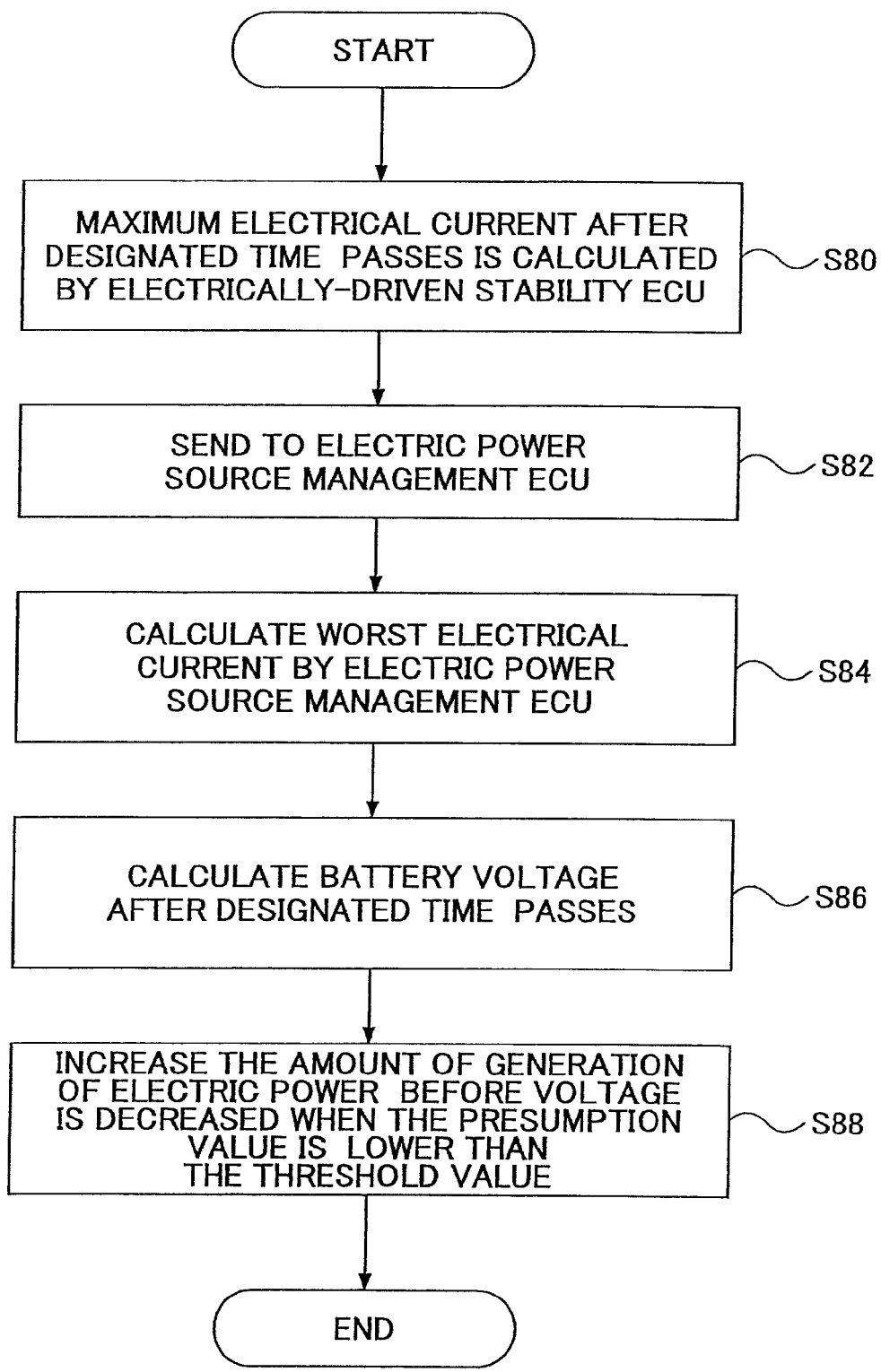
FIG. 11 is a flowchart of operations of the power supply control device for the vehicle of the third embodiment of the present invention.

FIG. 11 is a flow chart of operations of the power supply control device for the vehicle of the third embodiment of the present invention. The electrically-driven stability ECU 2a and others make presumption calculating of the maximum value of the operations electrical current after the designated time of the electrical loading controlled by the electrically-driven stability ECU 2a and others passes in step S80. The electrically-driven stability ECU 2a and others send the presumption calculating value to the electric power source management ECU 40 in step S82. The electric power source management ECU 40 obtaining the presumption calculating value from each ECU calculates the worst value of the presumption calculating value presumed after the designated time passes in step S84. Based on the worst value and the voltage of the current battery 10, the presumption value of the battery voltage after the designated time passes is calculated in step S86.

If the presumption value of the battery voltage is lower than the designated threshold value such as 10 V, the electric power source management ECU 40 orders the increase of the engine rotational speed, orders the increase of the amount of generation of electric power to the alternator 12, or orders to other electrical loading connected to the electric power source line 13 so that the electrical loading is operated in a direction where the consumption electrical current is decreased (for example, order of operations stop or order of decrease of temperature of the air conditioner or amount of air flow). As a result of this, before reaching the designated time, the voltage of the battery 10 exceeds the threshold value in step S88.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

This patent application is based on Japanese Priority Patent Application No. 2006-287762 filed on Oct. 23, 2006, the entire contents of which are hereby incorporated by reference.

The invention claimed is:

1. A power supply control device for a vehicle, comprising:
a plurality of electrical loadings installed in the vehicle;
a feeding part configured to supply electric power to the electrical loadings; and
a presumption part configured to obtain a result of presumption by presuming an electrical power demand for operating the electrical loadings based on sign information for foreseeable operations of the electrical loadings after a designated time;
wherein the feeding part is configured to adjust electrical power supply from the feeding part to each of the electrical loadings after the designated time based on the result of presumption by the presumption part,
wherein, at one of the electrical loadings, electrical power consumption is generated at a time when a grace period passes after the electric power consumption is required, and
wherein each of the electrical loadings is configured to compare its own grace period to a grace period of another one of the electrical loadings received via a communication line, and to generate electric power consumption when its own grace period is shorter than the grace period of the another one of the electrical loadings received via the communication line.

2. The power supply control device for the vehicle as claimed in claim 1, wherein the presumption part presumes timing of electric power consumption of the electrical loadings, and
wherein the feeding part is configured to adjust electrical power supply from the feeding part so that the timing of the electrical loadings is not overlapped.

3. The power supply control device for the vehicle as claimed in claim 1, wherein the one of the electrical loadings changes the length of the grace period based on the sign information.

4. The power supply control device for the vehicle as claimed in claim 1, wherein each of the electrical loadings is configured to delay generation of electric power consumption when its own grace period is longer than the grace period of the another one of the electrical loadings received via the communication line.

5. The power supply control device for the vehicle as claimed in claim 1,
wherein the presumption part presumes a consumption electrical current of the electrical loading; and control is performed so that the sum of the consumption electrical currents presumed by the presumption part does not exceed a feeding limitation value of the feeding part.

6. The power supply control device for the vehicle as claimed in claim 5,
wherein the electrical current supplied from the feeding part to the electrical loading is limited.

7. The power supply control device for the vehicle as claimed in claim 5,
wherein the feeding limitation value is heightened by increasing a feeding capability of the feeding part.

8. The power supply control device for the vehicle as claimed in claim 1,
wherein a control device is provided for every electrical loading; and
each control device includes the presumption part.

9. The power supply control device for the vehicle as claimed in claim 1,
wherein a first electrical loading configured to consume electrical power based on a steering state of the vehicle is contained in the electrical loading; and
the presumption by the presumption part is performed based on a sight line or a face direction of a driver, sign of operation of the first electrical loading.

10. The power supply control device for the vehicle as claimed in claim 1,
wherein a first electrical loading configured to consume an electrical power based on a steering state of the vehicle is contained in the electrical loading; and
the presumption by the presumption part is performed based on a configuration of a load, sign of operation of the first electrical loading.

11. The power supply control device for the vehicle as claimed in claim 1,
wherein a second electrical loading configured to consume electrical power based on horizontal acceleration of the vehicle is contained in the electrical loading; and
the presumption by the presumption part is performed based on a configuration of a load, sign of operation of the second electrical loading.

12. The power supply control device for the vehicle as claimed in claim 1,
wherein a third electrical loading configured to consume an electrical power based on a braking state of the vehicle is contained in the electrical loading; and
the presumption by the presumption part is performed based on a loading given to a braking control part to the driver, sign of operation of the third electrical loading.

13. The power supply control device for the vehicle as claimed in claim 1,
wherein a fourth electrical loading configured to consume an electrical power based on the rotational speed of engine of the vehicle is contained in the electrical loading; and
the presumption by the presumption part is performed based on the rotational speed of the engine, sign of operation of the fourth electrical loading.

14. The power supply control device for the vehicle as claimed in claim 9,
wherein the first electrical loading is a motor for providing for an electrically driven power steering.

15. The power supply control device for the vehicle as claimed in claim 9,
wherein the second electrical loading is a motor for providing for an electrically driven stability control device.

16. The power supply control device for the vehicle as claimed in claim 12,
wherein the third electrical loading is a motor for providing for an electrically driven brake device.

17. The power supply control device for the vehicle as claimed in claim 13,
wherein the fourth electrical loading is a secondary air supply device.

18. A power supply control device for a vehicle, the power supply control device comprising:
electrical loadings installed in the vehicle;
an electric power supply which supplies electric power to the electrical loadings; and
a processor configured to determine a predicted electrical power demand for operating the electrical loadings using information regarding foreseeable operations of the electrical loadings after a designated time;
wherein the electric power supply adjusts electrical power supply to the electrical loadings after the designated time using the determined predicted electrical power demand,
wherein each one of the electrical loadings has a grace period during which initiation of electric power consumption by the respective one of the electrical loadings may be delayed after being requested, and
wherein each of the electrical loadings is configured to compare its own grace period to a grace period of another one of the electrical loadings that is received via a communication line, and to initiate electric power consumption when its own grace period is shorter than the grace period of the another one of the electrical loadings that is received via the communication line.

19. The power supply control device of claim 18, wherein each of the electrical loadings is configured to initiate electric power consumption only if its own grace period is shorter than the grace period of the another one of the electrical loadings that is received.

20. The power supply control device of claim 19, wherein each of the electrical loadings is configured to delay initiating electric power consumption when its own grace period is longer than the grace period of the another one of the electrical loadings that is received.

* * * * *